(12) United States Patent
Hofer et al.

(10) Patent No.: US 12,734,531 B2
(45) Date of Patent: Sep. 15, 2026

(54) APPARATUS AND PROCESS FOR SEPARATING COMPONENTS OF A MULTIPHASE HYDROCARBON STREAM

(71) Applicant: OMV DOWNSTREAM GMBH, Vienna (AT)

(72) Inventors: Wolfgang Hofer, Vienna (AT); Andreas Lechleitner, Vienna (AT); Martina Baroncelli, Munich (DE)

(73) Assignee: OMV DOWNSTREAM GMBH, Vienna (AT)

(*) Notice: Subject to any disclaimer, the term of this patent is extended or adjusted under 35 U.S.C. 154(b) by 364 days.

(21) Appl. No.: 18/689,546

(22) PCT Filed: Sep. 6, 2022

(86) PCT No.: PCT/EP2022/074673
§ 371 (c)(1),
(2) Date: Mar. 6, 2024

(87) PCT Pub. No.: WO2023/036751
PCT Pub. Date: Mar. 16, 2023

(65) Prior Publication Data

US 2024/0375127 A1 Nov. 14, 2024

(30) Foreign Application Priority Data

Sep. 7, 2021 (EP) .................................... 21195298

(51) Int. Cl.
*B04C 5/103* (2006.01)
*B01D 21/24* (2006.01)
(Continued)

(52) U.S. Cl.
CPC .......... *B04C 5/103* (2013.01); *B01D 21/2416* (2013.01); *B01D 21/267* (2013.01);
(Continued)

(58) Field of Classification Search
CPC ........... B04C 5/103; B04C 5/04; B04C 5/181; B04C 5/20; B01D 21/2416; B01D 21/267;
(Continued)

(56) References Cited

U.S. PATENT DOCUMENTS 2,776,931 A 1/1957 Chaney
2,927,890 A 3/1960 Metrailer
(Continued)

FOREIGN PATENT DOCUMENTS

DE 1255082 B 11/1967
WO 2020168062 A1 8/2020

OTHER PUBLICATIONS

European Search Report dated Feb. 25, 2022 issued in European Patent Application No. 21195298.1, 10 pp.
(Continued)

*Primary Examiner* — Liam Royce
(74) *Attorney, Agent, or Firm* — NIXON & VANDERHYE P.C.

(57) ABSTRACT

An apparatus and a process enable separating components of a multiphase hydrocarbon stream. The apparatus may include an outer vessel having a top end with a top outlet and a bottom end with a bottom outlet, with a longitudinal axis extending between the top end and the bottom end. An outer vessel body disposed between the top end and the bottom end has an outer vessel internal volume in fluid communication with the top outlet and the bottom outlet. The outer vessel body may include a first section with a tangential inlet arranged to introduce the multiphase hydrocarbon stream tangentially into the outer vessel internal volume to create a vortex flow, and a second section arranged closer to the bottom end than the first section. The outer vessel internal volume has a smaller cross-sectional circumference in the second section than in the first section. An inner vessel
(Continued)

disposed within the outer vessel body includes an inner vessel body having an inner vessel internal volume, and an inner bottom inlet oriented toward the bottom end of the outer vessel and in fluid communication with the inner vessel internal volume and with the outer vessel internal volume. A traversing conduit in fluid communication with the inner vessel internal volume may traverse the outer vessel body.

15 Claims, 2 Drawing Sheets

(51) Int. Cl.

| | |
|---|---|
| ***B01D 21/26*** | (2006.01) |
| ***B04C 5/04*** | (2006.01) |
| ***B04C 5/181*** | (2006.01) |
| ***B04C 5/20*** | (2006.01) |
| ***B29B 17/04*** | (2006.01) |

(52) U.S. Cl.
CPC ................ *B04C 5/04* (2013.01); *B04C 5/181* (2013.01); *B04C 5/20* (2013.01); *B29B 17/04* (2013.01); *B01D 21/2411* (2013.01); *B29B 2017/0496* (2013.01)

(58) Field of Classification Search
CPC ................ B01D 21/2411; B29B 17/04; B29B 2017/0496
See application file for complete search history.

(56) References Cited

U.S. PATENT DOCUMENTS

| | | | | |
|---|---|---|---|---|
| 3,885,933 | A * | 5/1975 | Putney | B04C 5/103 55/459.1 |
| 4,749,490 | A | 6/1988 | Smyth et al. | |
| 4,778,494 | A | 10/1988 | Patterson | |
| 6,019,825 | A | 2/2000 | Greene et al. | |
| 8,114,283 | B2 * | 2/2012 | Parkinson | B04C 5/18 210/512.1 |
| 9,861,921 | B2 * | 1/2018 | Hemstock | B04C 5/103 |
| 2014/0151290 | A1 * | 6/2014 | Ford | B04C 5/081 210/512.1 |
| 2018/0326326 | A1 * | 11/2018 | Opawale | B04C 5/13 |

OTHER PUBLICATIONS

International Search Report dated Dec. 21, 2022 issued in PCT International Patent Application No. PCT/EP2022/074673, 2 pp.
Indian Office Action dated May 14, 2026 issued in Indian Patent Application No. 202417001381, 7 pp.

* cited by examiner

APPARATUS AND PROCESS FOR SEPARATING COMPONENTS OF A MULTIPHASE HYDROCARBON STREAM

This application is the U.S. national phase of International Application No. PCT/EP2022/074673 filed Sep. 6, 2022 which designated the U.S. and claims priority to EP 21195298.1 filed Sep. 7, 2021, the entire contents of each of which are hereby incorporated by reference.

The present invention relates to an apparatus and a process for separating components of a multiphase hydrocarbon stream.

Hydrocarbon cracking processes generally involve breaking down longer-chain hydrocarbons into shorter-chain hydrocarbons, usually under moderate or high temperatures, e.g. between 40° and 600° C., (thermal cracking) and/or in the presence of catalysts (catalytic cracking). A particularly interesting application of cracking processes is the depolymerization of plastic materials, which is used in the recycling of plastic waste.

Cracking processes usually give rise to complex mixtures of hydrocarbons that need to be at least partially separated. Such mixtures obtained from a cracking reactor are usually multiphase systems, comprising vapor, liquids and sometimes also solid components. For instance, the vapor phase may contain desired cracked hydrocarbons, the liquid phase may contain hydrocarbons that have not yet been sufficiently cracked, and the solid phase may include coke particles. In addition, impurities may be present, in particular in the context of the recycling of plastic waste. Solid impurities may, apart from coke particles, include e.g. aluminum powder, fillers, or ashes. Vapor impurities may e.g. comprise certain organophosphorous components commonly used in plastic materials.

WO 2020/168062 A1 discloses a process for removing coke and tar from a steam cracker furnace effluent, wherein a quenched furnace effluent is introduced into a centrifugal separator, wherein a vapor product and a centrifugal separator bottoms comprising at least a portion of the coke and/or tar are separated.

U.S. Pat. No. 2,776,931 discloses a process and apparatus for quenching and separating hot effluent vapors from a coking operation, wherein hot effluent vapors are quenched, thereby liquefying certain high boiling contaminants, and then separating in a cyclonic separation zone liquid and solids from the remaining quenched vapors.

U.S. Pat. No. 2,927,890 discloses a process involving the separation and quenching of gaseous products from a thermal conversion of a residual petroleum oil feed, wherein a quenched stream is passed into a cyclonic separation zone to separate uncondensed vapors from entrained solids and a liquid stream, and wherein afterwards the liquid stream is separated from the solids.

It is an object of the present invention to at least alleviate one or more of the drawbacks of the prior art. In particular, it is an object of the present invention to provide an apparatus and a process that allow at least a partial separation of vaporous, liquid and solid components of a multiphase hydrocarbon stream in a single piece of equipment. In addition, it is a further object of the present invention to provide an apparatus and a process that allow for a more efficient removal of impurities from a multiphase hydrocarbon stream, in particular in a multiphase hydrocarbon stream obtained from the depolymerisation of plastic materials.

For this purpose, the present invention provides an apparatus for separating components of a multiphase hydrocarbon stream, the apparatus comprising:

- an outer vessel having a top end comprising a top outlet, a bottom end comprising a bottom outlet, with a longitudinal axis extending between the top end and the bottom end, and an outer vessel body disposed between the top end and the bottom end and having an outer vessel internal volume in fluid communication with the top outlet and the bottom outlet;
- wherein the outer vessel body comprises:
  - a first section comprising a tangential inlet arranged to introduce the multiphase hydrocarbon stream tangentially into the outer vessel internal volume to create a vortex flow, and
  - a second section arranged closer to the bottom end than the first section, wherein the outer vessel internal volume has a smaller cross-sectional circumference in the second section than in the first section;
- an inner vessel disposed within the outer vessel body, said inner vessel comprising:
  - an inner vessel body having an inner vessel internal volume, and
  - an inner bottom inlet oriented toward the bottom end of the outer vessel and in fluid communication with the inner vessel internal volume and with the outer vessel internal volume; and
- a traversing conduit in fluid communication with the inner vessel internal volume and traversing the outer vessel body.

In another aspect, the invention provides a process for separating components of a multiphase hydrocarbon stream in an apparatus according to the invention, the process comprising the steps of:

- introducing the multiphase hydrocarbon stream via the tangential inlet into the outer vessel internal volume to create a vortex flow, whereby a vapor product is separated from the hydrocarbon stream and conveyed to the top outlet;
- recovering said vapor product from the top outlet;
- conveying the hydrocarbon stream from the first section to the second section, thereby increasing the tangential velocity of the vortex flow, wherein the hydrocarbon stream is separated into a solid-enriched product stream and a solid-reduced product stream, wherein the solid-enriched product stream is conveyed to the bottom outlet;
- recovering the solid-enriched product stream from the bottom outlet;
- conveying the solid-reduced product stream to the inner vessel internal volume via the inner vessel bottom inlet; and
- recovering the solid-reduced product stream from the inner vessel internal volume via the traversing conduit.

The inventive apparatus and process allow to at least partially separate vaporous, liquid and solid components of a multiphase hydrocarbon stream in a single piece of equipment. In the context of the present invention, the term "multiphase" refers to the presence of more than one phase of matter. Preferably the multiphase hydrocarbon stream comprises at least three phases, in particular it comprises vaporous, liquid and solid components. The first section of the inventive apparatus advantageously allows to separate vapor from liquids and solids; the second section advantageously allows to further separate the liquid/solid mixture into a solid-enriched product stream and a solid-reduced product stream. Carrying out these two separation processes in a single piece of equipment decreases costs and complexity, while at the same time increasing efficiency. In addition, piping and control valves that may otherwise be needed to connect separate separation apparatuses can be avoided, leading to increased robustness and lower failure rates, e.g. due to clogging.

In the inventive apparatus, the outer vessel internal volume has a smaller cross-sectional circumference in the second section than in the first section of the outer vessel body. Unless specified otherwise, the term "cross-section" as used herein refers to an intersection with a plane that is substantially perpendicular to the longitudinal axis. Thus, the cross-sectional circumference of the outer vessel internal volume refers to the circumference of the area of the outer vessel internal volume in a cross-sectional plane that is substantially perpendicular to the longitudinal axis of the outer vessel. The first section of the outer vessel body allows to separate vapors from liquids and solids following the principle of cyclonic separation. Solid and liquid components are pushed radially outward toward the inner surface of the outer vessel body by centrifugal force and continue to move in an axial direction toward the second section, whereas vaporous components are pushed radially inward and move axially upward toward the top outlet. Providing a larger cross-sectional circumference in the first section reduces the axial velocity of the vapor product moving toward the top outlet, which advantageously reduces the dragging along of liquid droplets with the vapor and thus leads to an improved effectiveness of separation. At the same time, providing a smaller cross-sectional circumference in the second section allows for a higher tangential velocity of the vortex flow in the second section, which advantageously reduces the residence time and thereby reduces coking tendency. At the same time, the higher tangential velocity in the second section leads to a higher centrifugal force and thereby also improved separation efficiency in this section.

Preferably, the ratio of the cross-sectional circumference of the outer vessel internal volume in the second section to the cross-sectional circumference of the outer vessel internal volume in the first section is less than 0.95, preferably less than 0.9, more preferably less than 0.8, even more preferably less than 0.7, most preferably less than 0.6. It is especially preferred if said ratio is between 0.05 and 0.95, preferably between 0.1 and 0.9, more preferably between 0.25 and 0.8, even more preferably between 0.4 and 0.7, most preferably between 0.5 and 0.6.

Preferably the outer vessel internal volume in the first section has a ratio of its extension along the longitudinal axis to the diameter of its cross-sectional area between 0.2 and 5, preferably between 0.33 and 3, more preferably between 0.5 and 2, yet even more preferably between 0.75 and 1.8, most preferably between 1 and 1.4. In this context, it is especially preferred if the outer vessel internal volume in the first section is substantially cylindrical.

Preferably the outer vessel internal volume in the second section has a ratio of its extension along the longitudinal axis to the diameter of its cross-sectional area between 0.4 and 10, preferably between 0.66 and 6, more preferably between 1 and 4, yet even more preferably between 1.33 and 3, most preferably between 1.6 and 2.5. In this context, it is especially preferred if the outer vessel internal volume in the second section is substantially cylindrical.

In a preferred embodiment, the apparatus further comprises a third section connecting the first section and the second section. Preferably the outer vessel internal volume in said third section is substantially frustoconical.

In a preferred embodiment of the inventive process, the tangential velocity of the vortex flow in the first section is between 0.01 and 20 m/s, preferably between 0.05 and 10 m/s, more preferably between 0.1 and 5 m/s, most preferably between 0.2 and 2.5 m/s.

It is further preferred, if the tangential velocity of the vortex flow in the second section is between 0.05 and 10 m/s, preferably between 0.1 and 5 m/s, more preferably between 0.25 and 2.5 m/s, most preferably between 0.5 and 2 m/s.

In a preferred embodiment, the ratio of the tangential velocity of the vortex flow in the first section to the tangential velocity of the vortex flow in the second section is between 0.05 and 0.99, preferably between 0.1 and 0.95, more preferably between 0.2 and 0.9, even more preferably between 0.3 and 0.8, most preferably between 0.4 and 0.7.

In a further preferred embodiment, the average residence time of the vortex flow in the second section is between 0.1 and 30 minutes, preferably between 0.2 and 10 minutes, more preferably between 0.5 and 8 minutes, most preferably between 0.8 and 6 minutes. Preferably, the average residence time is determined by CFD simulation.

The tangential inlet comprised in the first section of the outer vessel body is arranged to enable the creation of a vortex flow inside the outer vessel internal volume when the multiphase hydrocarbon stream is introduced via said tangential inlet. The skilled person is familiar with such arrangements, as they are commonly used in cyclonic separators. Preferably, the tangential inlet is arranged tangentially to the cross-sectional area of the outer vessel internal volume in a plane that is substantially perpendicular to the longitudinal axis.

In a preferred embodiment, the inventive apparatus further comprises a tangential conduit in fluid communication with the tangential inlet, preferably wherein the tangential conduit comprises a flash valve. Preferably, said tangential conduit is fluidly connected to a hydrocarbon cracking reactor. Providing a flash valve allows for a flash evaporation of the hydrocarbon stream, wherein the hydrocarbon stream undergoes a reduction in pressure and at least some of the components of the hydrocarbon stream go from a liquid phase into a vapor phase.

In the context of the inventive apparatus it is preferred if the ratio of cross-sectional circumference of the inner vessel internal volume to the cross-sectional circumference of the outer internal volume in the second section is at least 0.1, preferably at least 0.25, more preferably at least 0.4, even more preferably at least 0.5, yet even more preferably at least 0.6. It is especially preferred if said ratio is between 0.1 and 0.99, preferably between 0.25 and 0.95, more preferably between 0.4 and 0.9, even more preferably between 0.5 and 0.85, yet even more preferably between 0.6 and 0.8. A high ratio has the advantage that a larger proportion of the outer vessel internal volume is occupied by the inner vessel body, which leads to a higher tangential velocity of the vortex flow. This advantageously reduces residence time and therefore coking tendency and at the same time can lead to a higher centrifugal force and thus enhanced separation.

Preferably, the solid-enriched product stream has a higher solid content than the solid-reduced product stream, preferably by at least 5%, more preferably by at least 10%, even more preferably by at least 20%, yet even more preferably by at least 50%. Preferably, the solid content as used herein corresponds to the ash content. The ash content is preferably determined according to ISO 6245:2001.

In a preferred embodiment, the inventive apparatus further comprises a cooling system fluidly connected to the top outlet, wherein the cooling system is adapted to condense a part of a vapor product exiting the outer vessel internal volume via the top outlet and convey the condensed part of the vapor product back into the outer vessel internal volume. Preferably, said cooling system comprises at least one spray nozzle. Similarly, in a preferred embodiment of the inventive process, said process further comprises the step of condensing a part of the vapor product exiting the outer vessel internal volume via the top outlet and conveying the condensed part of the vapor product back into the outer vessel internal volume. Preferably said condensing is achieved by spraying a fluid onto the vapor product, wherein the temperature of said fluid is lower than the temperature of the vapor product. Preferably the temperature of said fluid is between 120° C. and 350° C., preferably between 150° C. and 300° C., especially between 180° C. and 250° C. It is further preferred if said fluid is obtained by condensing and recycling a part of the recovered vapor product.

Condensing a part of the vapor product as described above allows a particularly effective removal of impurities from the vapor product. In particular high-boiling components, e.g. having a boiling point >410° C., can be effectively removed in this way. This is especially advantageous in the case of hydrocarbon mixtures obtained from the depolymerization of plastic materials, in particular plastic waste, since such materials often comprise undesired organophosphorous compounds, for instance the compound Tris (2, 4-di-tert-butylphenyl) phosphite. Such compounds can be at least partially removed from the vapor product by condensing a part of the vapor product exiting the outer vessel internal volume via the top outlet and conveying the condensed part of the vapor product back into the outer vessel internal volume.

The vapor product recovered from the inventive process may be supplied to further downstream separation and/or washing steps. Preferably, it may be supplied a downstream separation column for separating the vapor product into different product streams by distillation.

In the context of the inventive apparatus it is preferred if the outer vessel internal volume in the first section has a substantially elliptical cross-section, preferably a substantially circular cross-section. It is especially preferred, if the outer vessel internal volume in the first section is substantially cylindrical or substantially frustoconical, preferably substantially cylindrical. In the same way, it is preferred if the outer vessel internal volume in the second section has a substantially elliptical cross-section, preferably a substantially circular cross-section. It is especially preferred, if the outer vessel internal volume in the second section is substantially cylindrical or substantially frustoconical, preferably substantially cylindrical. In connection with all embodiments of the invention it is preferred that both the outer vessel internal volume in the first section and the outer vessel internal volume in the second section are substantially cylindrical or substantially frustoconical, especially substantially cylindrical.

In a preferred embodiment of the inventive apparatus, the first section comprises a second tangential inlet arranged to introduce the multiphase hydrocarbon stream tangentially into the outer vessel internal volume to create a vortex flow. Providing a second tangential inlet allows to distribute the introduction of the hydrocarbon stream over two separate inlets. This allows to increase the total amount of material entering the outer vessel internal volume while keeping the flow velocity at the tangential inlet low enough to reduce erosion caused by solids contained in the multiphase hydrocarbon stream. In addition, the second tangential inlet may serve as a back-up in case the first tangential inlet becomes clogged.

In another preferred embodiment of the inventive apparatus, the second section comprises a lower tangential inlet arranged to introduce a stream tangentially into the outer vessel internal volume. The lower tangential inlet may be used to further increase the tangential velocity of the vortex flow in the second section. This allows reducing the residence time and thereby the coking tendency, and at the same time can lead to a higher centrifugal force and thereby also improved separation in this section. In a preferred embodiment of the inventive process, at least a part of the recovered solid-enriched product stream is recycled and introduced via the lower tangential inlet into the second section of the outer vessel internal volume, preferably to further increase the tangential velocity of the vortex flow.

In a preferred embodiment, the inner vessel body is substantially cylindrical or substantially frustoconical, preferably substantially cylindrical. Preferably, the longitudinal axis of the inner vessel body is arranged substantially co-axially with the longitudinal axis of the outer vessel body. Preferably, at least a part of the inner vessel body is disposed within the second section of the outer vessel body.

Preferably the inner vessel internal volume has a ratio of its extension along the longitudinal axis to the diameter of its cross-sectional area between 0.5 and 10, more preferably between 1 and 6, yet even more preferably between 1.6 and 4, most preferably between 2.2 and 3.0. In this context, it is especially preferred if the inner vessel internal volume is substantially cylindrical.

In a preferred embodiment, the inner vessel comprises an inner top outlet oriented toward the top end of the outer vessel and in fluid communication with the outer vessel internal volume and the inner vessel internal volume. Such a top outlet allows vapor to exit from the inner vessel internal volume and be conveyed to the top outlet. Preferably, the traversing conduit traverses the outer vessel body at a position that is further down along the longitudinal axis than the inner top outlet of the inner vessel, such that liquid stream exits the inner vessel through the traversing conduit before the inner vessel overflows.

In this context it is preferred if the inner vessel comprises a barrier arranged between the inner top outlet and the top end of the outer vessel, wherein said barrier is arranged to at least partially block solids from entering the inner vessel internal volume via the inner top outlet but allow fluids, e.g. vapor, to exit the inner vessel internal volume via the inner top outlet. Preferably said barrier is conical and having an apex oriented towards the top end of the outer vessel.

In a preferred embodiment of the inventive process, the apparatus is operated at a temperature between 320° C. and 450° C., preferably between 360° C. and 400° C. Preferably, the temperature of the multiphase hydrocarbon stream at the tangential inlet is between 300° C. and 480° C., preferably between 330° C. and 450° C., more preferably between 350° C. and 420° C., most preferably between 360° C. and 400° C.

Preferably, the multiphase hydrocarbon stream is obtained from a hydrocarbon cracking reactor, which preferably is fluidly connected to the tangential inlet via a tangential conduit. In a preferred embodiment, the solid-reduced product stream recovered via the traversing conduit is recycled to said hydrocarbon cracking reactor.

In the context of the invention it is preferred if the multiphase hydrocarbon stream is obtained from the depolymerization of plastic materials, preferably plastic waste, especially preconsumer, post-consumer and/or post-industrial plastics. Preferably, the plastic materials comprise polyolefins, preferably selected from polyethylene and polypropylene, and/or polystyrene. Plastic depolymerization may preferably be by pyrolysis, especially by non-catalytic thermal cracking or by catalytic cracking.

In a preferred embodiment, the multiphase hydrocarbon stream comprises impurities selected from aluminum powder and/or organophosphorous compounds, especially Tris (2, 4-di-tert-butylphenyl) phosphite. Such impurities are commonly present in plastic materials, especially plastic waste. As described herein, the inventive apparatus is particularly well suited to effectively remove at least part of such impurities.

The present invention is further illustrated by the following figures, without being limited thereto.

Figure 1:
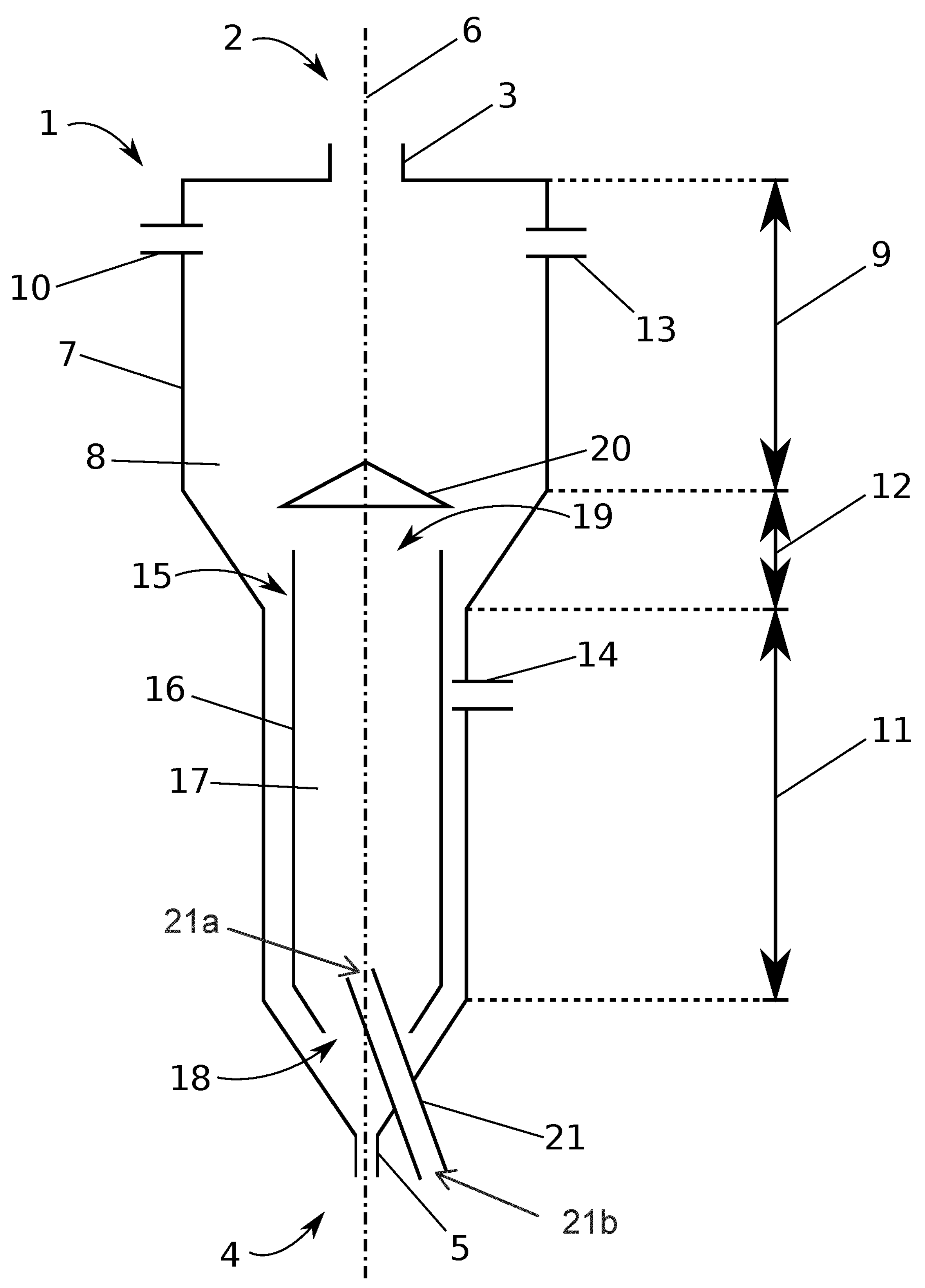
FIG. 1 shows a longitudinal section of a preferred embodiment of the apparatus according to the invention.

The apparatus shown in FIG. 1 comprises an outer vessel 1 having a top end 2 comprising a top outlet 3, a bottom end 4 comprising a bottom outlet 5, with a longitudinal axis 6 extending between the top end 2 and the bottom end 4. The outer vessel 1 further comprises an outer vessel body 7 disposed between the top end 2 and the bottom end 4 and having an outer vessel internal volume 8 in fluid communication with the top outlet 3 and the bottom outlet 5. The outer vessel body 7 comprises a first section 9 comprising a tangential inlet 10, and a second section 11 arranged closer to the bottom end 4 than the first section 9. In the depicted embodiment, both the first section 9 and the second section 11 are substantially cylindrical. They are connected by a substantially frustoconical third section 12 of the outer vessel body 7. The tangential inlet 10 is arranged to introduce the multiphase hydrocarbon stream 27 tangentially into the outer vessel internal volume 8 to create a vortex flow. This can be achieved by injecting the stream tangentially onto the inner surface of the outer vessel body 7, in order to create a vortex flow on said inner surface, in a similar way as commonly done in cyclonic separators. In addition, in the depicted embodiment, the first section 9 comprises a second tangential inlet 13, which may be similar in nature to the tangential inlet 10. The outer vessel internal volume 8 has a smaller cross-sectional circumference in the second section 11 than in the first section 9, which during operation allows for a higher tangential velocity of the vortex flow in the second section 11 than in the first section 9. In the depicted embodiment, the second section 11 comprises a lower tangential inlet 14, which may be used to introduce a liquid stream to further increase the tangential velocity of the vortex flow in the second section 11.

The apparatus shown in FIG. 1 further comprises an inner vessel 15 disposed within the outer vessel body 7. The inner vessel 15 comprises and inner vessel body 16 having an inner vessel internal volume 17 and an inner bottom inlet 18 oriented toward the bottom end 4 of the outer vessel 1 and fluidly connecting the inner vessel internal volume 17 with the outer vessel internal volume 8. In addition, in the depicted configuration, the inner vessel 15 comprises an inner top outlet 19 oriented toward the top end 2 of the outer vessel 1 and fluidly connecting the inner vessel internal volume 17 with the outer vessel internal volume 8. A barrier 20 is arranged between the inner top outlet 19 and the top end 2 to at least partially block solids from entering the inner vessel internal volume 17, while allowing fluids, such as vapors, to exit via the inner top outlet 19, for instance to be conveyed to the top outlet 3. The apparatus further comprises a traversing conduit 21 in fluid communication with the inner vessel internal volume 17, which traversing conduit 21 traverses the outer vessel body 7, so that a product stream can be conveyed from the inner vessel internal volume 17 outside of the outer vessel.

Figure 2:
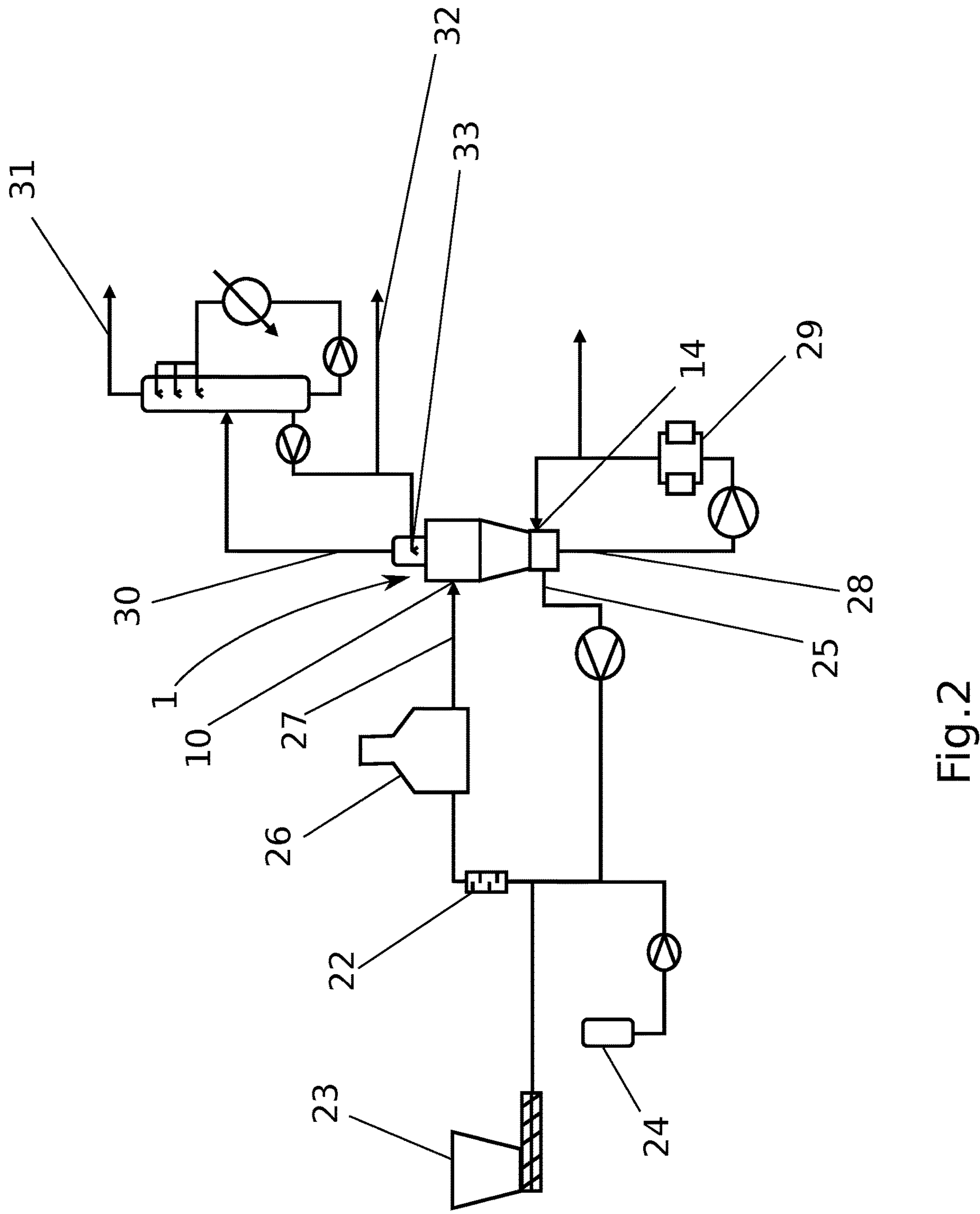
FIG. 2 shows a process flow diagram for a facility for processing plastic waste, comprising a preferred embodiment of the apparatus according to the invention.

For operating the apparatus depicted in FIG. 1 in the inventive process, a multiphase hydrocarbon stream 27, for instance obtained from the depolymerization of plastic material in a cracking reactor 26 as shown in FIG. 2, may be introduced into the outer vessel internal volume 8 via the tangential inlet 10 and/or the second tangential inlet 13 to create a vortex flow. As a result of centrifugal force, solids and liquids are pushed to the inner surface of the outer vessel body 7, whereas vaporous components are separated by moving radially inward and being conveyed to the top outlet 3. Preferably, the cross-sectional circumference in the first section 9 is low enough to ensure that the axial velocity of the vapor product 30 moving toward the top outlet 3 is low enough to reduce dragging along of liquid droplets. The vapor product 30 exiting the outer vessel internal volume 8 may be partially condensed in a cooling system, for instance by spraying a fluid onto the vapor product 30 using one or more spray nozzles 33. Said fluid may be obtained by condensing and recycling a part of the recovered vapor product 30. The condensation step allows to preferentially condense impurities having a higher boiling point than the desired components of the vapor product 30, for instance undesired organophosphorous compounds commonly found in plastic materials. The condensed part of the vapor product 30 is transferred back into the outer vessel internal volume 8 and may at least partially be removed through the solid-reduced product stream 25 and/or the solid-enriched product stream 28.

After separation of the vapor product 30, the remaining hydrocarbon stream is conveyed from the first section 9 via the third section 12 to the second section 11, whereby the tangential velocity of the vortex flow is increased due to the decreasing cross-sectional circumference. The higher tangential velocity leads to a shorter residence time, thereby reducing the coking tendency. At the same time, the higher tangential velocity leads to a higher centrifugal force and therefore to a more effective separation. Through this centrifugal force, the hydrocarbon stream is separated into a solid-enriched product stream 28 and a solid-reduced product stream 25. The solid-enriched product stream 28 is conveyed to the bottom outlet. The solid-reduced product stream 25 generates liquid hold-up in the outer vessel internal volume 8 and thereby enters the inner vessel internal volume 17 via the inner bottom inlet 18, eventually reaching the traversing conduit 21, from which it can be recovered. Advantageously, the solid-reduced product stream enters the traversing conduit 21 at an inlet opening 21*a* and leaves the traversing conduit 21 at outlet opening 21*b*, whereas the outlet opening 21*b* is arranged outside the outer vessel body 7 and below the inlet opening 21*a*. Preferably, the traversing conduit 21 traverses the outer vessel body 7 at a position that is further down along the longitudinal axis 6 than the inner top outlet 19 of the inner vessel 15.

Advantageously, the recovered solid-reduced product stream 25 can be recycled back to the cracking reactor 26 for further cracking. The solid-enriched product stream 28 is recovered from the bottom outlet and may be supplied to further downstream separation steps, e.g. to a coke catcher 29. A part of the solid-enriched product stream 28 may be recycled and introduced into the lower tangential inlet 14 in order to further increase the tangential velocity of the vortex flow in the second section 11.

An application of a preferred embodiment of the inventive apparatus in a plastic processing facility can be seen from FIG. 2. Plastic material is supplied to an extruder 23, wherein it is compacted, molten and/or degassed. The molten plastic material, preferably at a temperature between 250° C. and 280° C., is mixed in a static mixer 22 with an external solvent 24, preferably heavy oil, and/or at least a part of the solid-reduced product stream 25 obtained from the inventive apparatus in order to reduce the viscosity of the plastic melt. The resulting mixture is then conveyed to a cracking reactor 26, wherein the plastic is depolymerized, preferably at a temperature between 400° C. and 440° C. From the cracking reactor 26, a multiphase hydrocarbon stream 27 is obtained, which is then introduced into the outer vessel 1 of the inventive apparatus via the tangential inlet 10 as described herein above. At least a part of the solid-reduced product stream 25 obtained from the inventive apparatus may be recycled and supplied to fresh plastic melt, preferably together with solvent 24. The solid-enriched product stream 28 is conveyed to a coke catcher 29 to remove coke particles and at least a part of the resulting stream may be recycled and injected into the lower tangential inlet 14 of the inventive apparatus, as described above. The vapor product 30 obtained from the inventive apparatus is further separated into a light product 31, preferably having a boiling range from 35° C. to 225° C., and a heavy product 32, preferably having a boiling range from 225° C. to 410° C. A part of the heavy product 32 may be recycled to a spray nozzle 33 arranged to cool and condense a part of the vapor product 30, as described herein above.

The invention claimed is:

1. An apparatus for separating components of a multiphase hydrocarbon stream, the apparatus comprising:

an outer vessel having a top end comprising a top outlet, a bottom end comprising a bottom outlet, with a longitudinal axis extending between the top end and the bottom end, and an outer vessel body disposed between the top end and the bottom end and having an outer vessel internal volume in fluid communication with the top outlet and the bottom outlet;

wherein the outer vessel body comprises:

a first section comprising a tangential inlet arranged to introduce the multiphase hydrocarbon stream tangentially into the outer vessel internal volume to create a vortex flow, and a second section arranged closer to the bottom end than the first section, wherein the outer vessel internal volume has a smaller cross-sectional circumference in the second section than in the first section;

an inner vessel disposed within the outer vessel body, said inner vessel comprising:

an inner vessel body having an inner vessel internal volume, and an inner bottom inlet oriented toward the bottom end of the outer vessel and in fluid communication with the inner vessel internal volume and with the outer vessel internal volume, and an inner top outlet oriented toward the top end of the outer vessel and in fluid communication with the outer vessel internal volume and the inner vessel internal volume; and a traversing conduit in fluid communication with the inner vessel internal volume and traversing the outer vessel body, so that a product stream can be conveyed from the inner vessel internal volume outside of the outer vessel, wherein the traversing conduit traverses the outer vessel body at a position that is further down along the longitudinal axis than the inner top outlet of the inner vessel.

2. The apparatus according to claim 1, wherein a ratio of the cross-sectional circumference of the outer vessel internal volume in the second section to the cross-sectional circumference of the outer vessel internal volume in the first section is between 0.05 and 0.95.

3. The apparatus according to claim 1, wherein the apparatus further comprises a cooling system fluidly connected to the top outlet, wherein the cooling system is adapted to condense a part of a vapor product exiting the outer vessel internal volume via the top outlet and convey the condensed part of the vapor product back into the outer vessel internal volume.

4. The apparatus according to claim 1, wherein the outer vessel internal volume in the first section and/or in the second section is substantially cylindrical or substantially frustoconical.

5. The apparatus according to claim 1, wherein the first section comprises a second tangential inlet arranged to introduce the multiphase hydrocarbon stream tangentially into the outer vessel internal volume to create a vortex flow.

6. The apparatus according to claim 1, wherein the second section comprises a lower tangential inlet arranged to introduce a stream tangentially into the outer vessel internal volume.

7. The apparatus according to claim 1, wherein the inner vessel comprises a barrier arranged between the inner top outlet and the top end of the outer vessel, wherein said barrier is arranged to at least partially block solids from entering the inner vessel internal volume via the inner top outlet but allow fluids to exit the inner vessel internal volume via the inner top outlet.

8. A process for separating components of a multiphase hydrocarbon stream in an apparatus according to claim 1, the process comprising the steps of:

introducing the multiphase hydrocarbon stream via the tangential inlet into the outer vessel internal volume to create a vortex flow, whereby a vapor product is separated from the hydrocarbon stream and conveyed to the top outlet;

recovering said vapor product from the top outlet;

conveying the hydrocarbon stream from the first section to the second section, thereby increasing a tangential velocity of the vortex flow, wherein the hydrocarbon stream is separated into a solid-enriched product stream and a solid-reduced product stream, wherein the solid-enriched product stream is conveyed to the bottom outlet;

recovering the solid-enriched product stream from the bottom outlet;

conveying the solid-reduced product stream to the inner vessel internal volume via the inner bottom inlet; and recovering the solid-reduced product stream from the inner vessel internal volume via the traversing conduit.

9. The process according to claim 8, wherein the process further comprises the step of condensing a part of the vapor product exiting the outer vessel internal volume via the top outlet and conveying the condensed part of the vapor product back into the outer vessel internal volume.

10. The process according to claim 9, wherein said condensing is achieved by spraying a fluid onto the vapor product, wherein a temperature of said fluid is lower than a temperature of the vapor product.

11. The process according to claim 10, wherein said fluid is obtained by condensing and recycling a part of the recovered vapor product.

12. The process according to claim 8, wherein a temperature of the multiphase hydrocarbon stream at the tangential inlet is between 300° C. and 480° C.

13. The process according to claim 8, wherein the multiphase hydrocarbon stream is obtained from depolymerization of plastic materials.

14. The process according to claim 13, wherein the plastic materials comprise polyolefins.

15. The process according to claim 8, wherein the multiphase hydrocarbon stream comprises impurities selected from aluminum powder and/or organophosphorous compounds.

* * * * *